United States Patent
Kusakabe et al.

(10) Patent No.: US 6,667,369 B2
(45) Date of Patent: Dec. 23, 2003

(54) PROCESSES FOR PREPARING (METH) ACRYLIC POLYMERS HAVING FUNCTIONAL GROUPS AT THE CHAIN ENDS

(75) Inventors: Masato Kusakabe, Kobe (JP); Kenichi Kitano, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/142,877

(22) Filed: May 13, 2002

(65) Prior Publication Data

US 2002/0177670 A1 Nov. 28, 2002

Related U.S. Application Data

(60) Continuation of application No. PCT/JP00/01763, filed on Mar. 23, 2000, which is a division of application No. 09/356,515, filed on Jul. 19, 1999, now Pat. No. 6,420,492, which is a division of application No. 08/798,034, filed on Feb. 6, 1997, now Pat. No. 5,986,014.

(30) Foreign Application Priority Data

Feb. 8, 1996 (JP) .............................................. 8-022233
Dec. 6, 1996 (JP) .............................................. 8-326475

(51) Int. Cl.$^7$ ......................... C08L 33/04; C08C 19/00; C08F 8/26; C08F 8/42
(52) U.S. Cl. ...................... 525/342; 525/360; 525/418; 525/474; 525/478
(58) Field of Search ................................ 525/342, 360, 525/418, 474, 478

(56) References Cited

U.S. PATENT DOCUMENTS

| | | | |
|---|---|---|---|
| 4,518,726 A | 5/1985 | Kato ........................... | 524/32 |
| 5,763,548 A | 6/1998 | Matyjaszewski et al. ... | 526/135 |
| 5,773,534 A | 6/1998 | Antonelli ..................... | 526/82 |
| 5,789,487 A | 8/1998 | Matyjaszewski et al. ... | 525/301 |
| 5,807,937 A * | 9/1998 | Matyjaszewski ............ | 526/135 |
| 5,986,014 A | 11/1999 | Kusakabe ................... | 525/342 |
| 6,040,009 A * | 3/2000 | Marutani .................... | 427/241 |

FOREIGN PATENT DOCUMENTS

| | | |
|---|---|---|
| DE | 14 95 726 | 11/1969 |
| DE | 24 058 064 | 8/1975 |
| DE | 37 10 343 | 10/1988 |
| EP | 0002974 | 12/1978 |
| EP | 0 101 541 | 2/1984 |
| EP | 0 264 214 | 10/1987 |
| FR | 1 456 964 | 10/1966 |
| GB | 1127625 | 9/1968 |
| GB | 1128368 | 9/1968 |
| WO | WO96/30421 | 10/1996 |
| WO | WO97/18247 | 5/1997 |
| WO | WO98/01480 | 1/1998 |

OTHER PUBLICATIONS

"Free Radical Chain Reaction of Allylic Tin Compounds . . . "; Migita et al.; Bull. Chem. Soc. Jpn., vol. 56, No. 8; 1983; pps. 2480–2484.
"Polymerization of Methyl Methacrylate with Carbon . . . "; Kato et al.; Macromolecules 1995, vol. 28, pps. 1721–1723.
"Polymers with Very Low Polydispersities from Atom . . . "; Patten et al.; Science, vol. 272, pps. 866–868, May 10, 1996.
"Controlled/"Living" Radical Polymerization. Halogen Atom Transfer Radical Polymerization Promoted by a Cu(I)/Cu(II) Redox Process"; Wang et al; Macromolecules 1995, vol. 28, pps. 7901–7910.
"Controlled/"Living" Radical Polymerization. Atom Transfer Radical Polymerization in the Presence of Transition-Metal Complexes"; Wang et al.; American Chemical Society 1995; pps. 5614–5615.
"Controlled Radical Polymerization of Methacrylic Monomers . . . " Granel et al; Macromolecules 1996, vol. 29, pps. 8576–8582.
"The Synthesis of End Functional Polymers by "Living" Radical Polymerization"; Nakagawa et al.; ACS Polymer Reprints vol. 37, No. 1; 1996, pps. 577–578.

* cited by examiner

Primary Examiner—Fred Zitomer
(74) Attorney, Agent, or Firm—Armstrong, Kratz, Quintos, Hanson & Brooks, LLP

(57) ABSTRACT

(Meth)acrylic polymers having alkenyl or curable silyl groups at the chain ends in high functionality ratios are prepared by a process which comprises (i) preparing a (meth)acrylic polymer having halogen atoms at the chain ends, using an organohalogenated compound or a halosulfonyl compound as an initiator and a metal complex catalyst wherein the central metal atom is selected from the group consisting of the elements of Groups 8, 9, 10 and 11 of the periodic table; and (ii) transforming the halogen atom into an alkenyl group- or a curable silyl group-containing substituent. The obtained (meth)acrylic polymers form homogeneous curing materials.

8 Claims, No Drawings

PROCESSES FOR PREPARING (METH) ACRYLIC POLYMERS HAVING FUNCTIONAL GROUPS AT THE CHAIN ENDS

This application is a divisional of prior U.S. application Ser. No. 09/356,515 filed Jul. 19, 1999 now U.S. Pat. No. 6,420,492, which is a divisional of U.S. application Ser. No. 08/798,034 filed Feb. 6, 1997 now U.S. Pat. No. 5,986,014, which is a continuation of prior International Application Serial No. PCT/JP00/01763, filed Mar. 23, 2000.

FIELD OF THE INVENTION

The present invention relates to processes for preparing (meth)acrylic polymers having functional groups, especially, alkenyl groups or curable silyl groups, at the chain ends, and curable compositions containing those polymers.

BACKGROUND OF THE INVENTION

Polymers having functional groups at the chain ends can be cured by themselves or with the help of an adequate curing agent to give cross-linked materials with high heat resistance and durability. Representative examples are the polymers having alkenyl groups or curable silyl groups at the chain ends. A polymer having alkenyl groups at the chain ends can be cured using a polyvalent hydrogensilicon compound as a curing agent or by photopolymerization. A polymer having curable silyl groups can be cured by absorbing moisture in the presence of an adequate condensation catalyst to give a cross-linked material.

Some examples of the main chain structure of these polymers are the polyether polymers such as polyethylene oxide, polypropylene oxide and polytetramethylene oxide; the hydrocarbon polymers such as polybutadiene, polyisoprene, polychloroprene, polyisobutylene and their hydrogenated derivatives; the polyester polymers such as polyethylene terephthalate, polybutyleneterephthalate and polycaprolactone. These polymers are being used for many applications based on their main chain structure and curing system.

The polymers exemplified as above are prepared by ionic polymerization or polycondensation. On the other hand, vinyl polymers having functional groups at the chain ends, which may be prepared by radical polymerization, are rarely commercialized. Among vinyl polymers, (meth)acrylic polymers exhibit excellent physical properties such as high weatherability and clarity, which properties can not be obtained from the aforementioned polyether polymers, hydrocarbon polymers and polyester polymers. Due to those properties, (meth)acrylic polymers possessing alkenyl groups or curable silyl groups at the side chains are being used for high weatherability paints.

(Meth)acrylic polymers having alkenyl or curable silyl groups at the chain ends would impart to the cross-linked material with better mechanical properties than obtained with (meth)acrylic polymers with such functional groups at their side chains. Considerable efforts have been made so far to develop a method to synthesize such polymers, however, their commercial production has yet to be reached.

Unexamined Japanese Patent Publication No.5-255415 (1993) discloses a synthetic method for the preparation of (meth)acrylic polymers having alkenyl groups at both ends using an alkenyl group-containing disulfide compound as a chain transfer agent. Unexamined Japanese Patent Publication No.5-262808 (1993) also discloses a synthetic method for (meth)acrylic polymers having alkenyl groups at both ends via (meth)acrylic polymers with a hydroxyl group at both ends, which in turn, are prepared using a large excess of a hydroxyl group-containing disulfide compound as a chain transfer agent. However, it is difficult to introduce alkenyl groups onto both chain ends of the polymers in a high functionality ratio by these methods.

On the other hand, Unexamined Japanese Patent Publication No.59-168014 (1984) discloses a synthetic method for (meth)acrylic polymers having curable silyl groups at both ends using a curable silyl group-containing disulfide compound as a chain transfer agent. Unexamined Japanese Patent Publication No.61-133201 (1986) also discloses a method for the preparation of (meth)acrylic polymers using a curable silyl group-containing hydrogensilicon compound or a halosilane compound as a chain transfer agent. However, it is also difficult to introduce curable silyl groups onto both chain ends of the polymers in a high functionality ratio by these methods.

The object of the present invention is to provide methods for the preparation of (meth)acrylic polymers having alkenyl groups or curable silyl groups at the chain ends in a higher functionality ratio than those obtained by the conventional methods, and also provides curable compositions containing those polymers.

Recently, new living radical polymerization methods were developed and made possible the synthesis of (meth) acrylic polymers having halogen atoms at the chain ends in a high ratio (see: Matyjaszewski et al, *J. Am. Chem. Soc.* 1995, 117, 5614; *Macromolecules* 1995, 28, 7901; *Science* 1996, 272, 866; Sawamoto et al, *Macromolecules* 1995, 28, 1721).

The present inventors have found that (meth)acrylic polymers having alkenyl groups or curable silyl groups at the chain ends in a high functionality ratio can be obtained by using the above living radical polymerization method.

SUMMARY OF THE INVENTION

Among the above mentioned polymers, (meth) acrylic polymers having alkenyl groups at the chain ends can be obtained by the method which comprises the steps of:

(i) preparing a (meth)acrylic polymer having a chain end structure of formula (1)

$$-CH_2-C\ (R^1)(CO_2R^2)(X) \qquad (1)$$

(wherein $R^1$ is hydrogen or methyl; $R^2$ is a $C_{1-20}$ alkyl, $C_{6-20}$ aryl or $C_{7-20}$ aralkyl; X is chlorine, bromine or iodine) by polymerizing (meth)acrylate monomers using an organohalogenated compound or a halosulfonyl compound as an initiator and a metal complex catalyst wherein the central metal atom is selected from the group consisting of the elements of Groups 8, 9, 10 and 11 of the periodic table; and (ii) converting the halogen atom in the structure of formula (1) into an alkenyl group-containing substituent.

A typical example of this process is the method which comprises the (meth)acrylic polymer obtained in step (i) above is reacted with a compound having a polymerizable alkenyl group and at least one other alkenyl group to convert the halogen atom in the structure of formula (1) into an alkenyl group-containing substituent.

Another example of the process is the method in which a (meth)acrylic polymer having the chain end structure of formula (1) is reacted with an alkenyl group-containing organometallic compound.

A further example of the process is the method which comprises:

(i) preparing a (meth)acrylic polymer having an alkenyl group at one chain end and a halogen-containing group of formula (1) at the other chain end by using an alkenyl group-containing halogenated compound as an initiator; and (ii) the transformation of the halogen-containing chain id end of formula (1) into an alkenyl group-containing substituent.

(Meth)acrylic polymers having alkenyl groups at the chain ends prepared according to the aforementioned methods can be used as main components for curable compositions in combination with polyvalent hydrogensilicon compounds as cross-linkers.

Next, (meth)acrylic polymers having curable silyl groups at the chain ends can be obtained by the method which comprises the steps of:

(i) preparing a (meth)acrylic polymer having a chain end structure of formula (1) by polymerizing (meth) acrylate monomers using an organohalogenated compound or a halosulfonyl compound as an initiator and a metal complex catalyst wherein the central metal atom is selected from the group consisting of the elements of Groups 8, 9, 10 and 11 of the periodic table; and (ii) converting the halogen atom in the structure of formula (1) into a curable silyl group-containing substituent.

A typical example of this process is one which comprises the (meth)acrylic polymer obtained in step (i) above is reacted with a compound having a polymerizable alkenyl group and a curable silyl group to convert the halogen atom in the structure of formula (1) into a curable silyl group-containing substituent.

Another example of the process is the method which comprises:

(i) preparing a (meth)acrylic polymer having a curable silyl group at one chain end and a halogen-containing group of formula (1) at the other chain end by using a curable silyl group-containing halogenated compound as an initiator; and (ii) the transformation of the halogen-containing chain end of the general formula (1) into a curable silyl group containing substituent.

A (meth)acrylic polymer having curable silyl groups at the chain ends can also be obtained by adding a curable silyl group-containing hydrogensilicon compound to a (meth) acrylic polymer having alkenyl groups at the chain ends prepared according to the aforementioned methods.

(Meth)acrylic polymers having curable silyl groups at the chain ends prepared according to the above mentioned methods can be used as main components of curable compositions.

It is also noteworthy that (meth)acrylic polymers having functional groups at the chain ends prepared by the present invention have a narrow molecular weight distribution.

DETAILED DESCRIPTION OF THE INVENTION

At first, the process for preparing a (meth)acrylic polymer having alkenyl groups at the chain ends consists of:

(i) preparing a (meth)acrylic polymer having a chain end structure of formula (1)

—CH$_2$—C(R$^1$)(CO$_2$R$^2$)(X)     (1)

(wherein R$^1$ is hydrogen or methyl; R$^2$ is a C$_{1-20}$ alkyl, C$_{6-20}$ aryl or C$_{7-20}$ aralkyl; X is chlorine, bromine or iodine) by polymerizing (meth)acrylate monomers using an organohalogenated compound or a halosulfonyl compound as an initiator and a metal complex catalyst wherein the central metal atom is selected from the group consisting of the elements of Groups 8, 9, 10 and 11 of the periodic table; and (ii) converting the halogen atom in the structure of formula (1) into an alkenyl group-containing substituent.

The polymerizations for the preparation of the (meth) acrylic polymer proceed in a living fashion to give polymers with a narrow molecular weight distribution ($M_w/M_n$= 1.1~1.5), and the molecular weight of the polymers can be controlled by controlling the feed ratio of monomers to initiators.

For these living radical polymerizations, organohalogenated compounds, particularly those possessing highly reactive carbon-halogen bond (for example, α-haloesters and benzyl halides), or halosulfonyl compounds are used as initiators.

In order to obtain curable (meth)acrylic polymers, an organohalogenated compound or a halosulfonyl compound having two or more initiating sites is used as an initiator. Such initiators are, in general, known compounds and include, but are not limited to, the following:

o-, m1-, p-XCH$_2$—C$_6$H$_4$—CH$_2$X, o-, m-, p-CH$_3$C(H)(X)—C$_6$H$_4$—C(H)(X)CH$_3$, o-, m-, p-(CH$_3$)$_2$C(X)—C$_6$H$_4$—C(X) (c$_3$)$_2$, (wherein C$_6$H$_4$ is phenylene; X is chlorine, bromine, or iodine)

RO$_2$C—C(H)(X)—(CH$_2$)$_n$—C(H)(X)—CO$_2$R,
RO$_2$C—C(CH$_3$)(X)—(CH$_2$)$_n$—C(CH$_3$)(X)—CO$_2$R,
RC(O)C(H)(X)—(CH$_2$)$_n$—C(H)(X)—C(O)R,
RC(O)C(CH$_3$)(X)—(CH$_2$)$_n$—C(CH$_3$)(X)—C(O)R,
XCH$_2$C(O)CH$_2$X, CH$_3$C(H)(X)C(O)C(H)(X)CH$_3$, (CH$_3$)$_2$C(x)C(O)C(x)(CH$_3$)$_2$,
C$_6$H$_5$C(H)(X)—(CH$_2$)$_n$—C(H)(X)C$_6$H$_5$,
XCH$_2$CO$_2$—(CH$_2$)$_n$—OCOCH$_2$X, CH$_3$C(H)(X)CO$_2$—(CH$_2$)$_n$—OCOC(H)(X)CH$_3$,
(CH$_3$)$_2$C(X)CO$_2$—(CH$_2$)$_n$—OCOC(X)(CH$_3$)$_2$, (wherein R is C$_{1-20}$ alkyl, C$_{6-20}$ aryl or C$_{7-20}$ aralkyl; n is an integer from 0 to 20; X is chlorine, bromine, or iodine)

XCH$_2$C(O)C(O)CH$_2$X, CH$_3$C(H)(X)C(O)C(O)C(H)(X)CH$_3$,
(CH$_3$)$_2$C(X)C(O)C(O)c(X) (CH$_3$)$_2$,
o-, m-, p-XCH$_2$CO$_2$—C$_6$H$_4$—OCOCH$_2$X,
o-, m-, p-CH$_3$C(H)(X)CO$_2$—C$_6$H$_4$—OCOC(H)(X)CH$_3$,
o-, m-, p-(CH$_3$)$_2$C(X)CO$_2$—C$_6$H$_4$—OCOC(X)(CH$_3$)$_2$,
o-, m-, p-XSO2—C$_6$H$_4$—SO$_2$x (wherein X is chlorine, bromine or iodine.)

Transition metal complexes wherein the central metal atom is selected from the group consisting of the elements of Groups 8, 9, 10 and 11 of the periodic table are used as catalysts. As such transition metal species, monovalent copper, divalent ruthenium and divalent iron are particularly preferable. Examples of monovalent copper species are copper (I) chloride, copper (I) bromide, copper (I) iodide, copper (I) cyanide, copper (I) oxide, copper (I) acetate and copper (I) perchlorate. In the case a copper (I) compound is used, compounds such as 2,2'-bipyridyl and its derivatives, 1,10-phenanthroline and its derivatives are preferably added as ligands to enhance the catalytic activity. The triphenylphosphine complex of divalent ruthenium chloride (RuCl$_2$(PPh$_3$)$_3$) can also be used as a catalyst. In the case this complex is used, an aluminum compound such as aluminum trialkoxide is added to enhance the catalytic activity. The triphenyl phosphine complex of divalent iron chloride (FeCl$_2$(PPh$_3$)$_3$) is also a preferable catalyst.

(Meth)acrylate monomers which are suitable for use in the practice of this invention are, in general, known compounds and include, but are not limited to, the following: methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth) acrylate, 2-ethylhexyl (meth)acrylate, n-nonyl (meth) acrylate, n-decyl (meth)acrylate, n-dodecyl (meth)acrylate, phenyl (meth)acrylate, toluyl (meth)acrylate, benzyl (meth) acrylate, 2-methoxyethyl (meth)acrylate, 3-methoxybutyl (meth)acrylate, 2-hydroxyethyl (meth)acrylate, 2-hydroxypropyl (meth)acrylate and the like. These monomers can be used alone or in combination of 2 or more compounds. Other vinyl monomers such as styrene, α-methylstyrene and acrylonitrile can be co-polymerized if necessary.

This polymerization can be conducted in bulk or in a solvent of various kinds at a temperature of from ambient temperature to 200° C., preferably from 50 to 150° C. Examples of the solvents which can be used for this polymerization include: acetone, 2-butanone, 2-pentanone, 3-pentanone, 2-hexanone, 2-heptanone, 4-methyl-2-pentanone, cyclohexanone, 2-methylcyclohexanone, 3-methylcyclohexanone, 4-methylcyclohexanone, acetophenone, 2-methylacetophenone, 3-methyl-acetophenone, 4-methylacetophenone, nitromethane, nitroethane, nitropropane, nitrobenzene, acetonitrile, propionitrile, benzo-nitrile, methanol, ethanol, 1-propanol, 2-propanol, 1-butanol, cyclohexyl alcohol, benzyl alcohol, hexane, heptane, octane, benzene, toluene, o-, m-, p-xylene, ethyl acetate and tetrahydrofuran.

(Meth)acrylic polymers having alkenyl groups at the chain ends can be prepared by the transformation of the chain end halogen atoms of (meth)acrylic polymers obtained by the above mentioned polymerization into the alkenyl group-containing substituents.

A first example of such transformation is the reaction of the (meth)acrylic polymer obtained by the above mentioned polymerization with a compound having a polymerizable alkenyl group and at least one other alkenyl group, as a second monomer.

In the above-mentioned living radical polymerization, the chain end is "living" and the polymerization starts again upon addition of a second vinyl monomer after the first (meth)acrylate monomer is consumed. Accordingly, when a compound having a polymerizable alkenyl group and at least one other alkenyl group is added after the polymerization of a (meth)acrylate monomer, the radical addition takes place through the polymerizable alkenyl group and the other alkenyl group remains unchanged, which gives a (meth) acrylic polymer having alkenyl groups at the chain ends. Such a second monomer may be added together with a catalyst after the isolation of a (meth)acrylic polymer, or may be added during the polymerization. In the latter case, the second monomer should be added after a large amount, preferably more than 80%, of the first (meth)acrylate monomer is consumed. Otherwise, the (meth)acrylic polymer would have alkenyl groups at side chains, not at the chain ends, and thus, the cross-linked product thereof would exhibit poor mechanical properties.

Addition of an equal amount of the said compound (the second monomer) to the number of chain end (which, in turn, is equal to the number of initiating sites) is sufficient to introduce an alkenyl group into all chain ends. However, the addition of an excess amount, preferably 1–5 times the number of the chain end, is preferred in order to secure the introduction of an alkenyl group into all chain ends. Addition of the second monomer in an amount greater than 5 times the number of the chain ends is not preferable since the alkenyl group is introduced densely onto the chain ends and thus, the cross-linked product thereof would exhibit poor mechanical properties.

A representative example of the compounds having a polymerizable alkenyl group and at least one other alkenyl group which is suitable for use in the practice of this invention is, but is not limited to, the compound of formula (2):

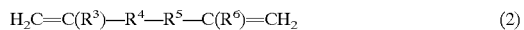

(wherein each of $R^3$ and $R^6$ is independently hydrogen or methyl; $R^4$ is —C(O)O—, or o-, m-, p-phenylene; $R^5$ is a direct connection or a $C_{1-20}$ divalent organic group which may contain at least one ether oxygen.)

The compound of formula (2) in which $R^4$ is an ester group is a (meth)acrylate derivative, and the compound of formula (2) in which $R^4$ is phenylene is a styrene derivative. Examples of $R^5$ in formula (2) are: alkylene groups such as methylene, ethylene and propylene; aralkylene groups such as o-, m-, p-phenylene and benzylene; and ether oxygen-containing alkylene groups such as —$CH_2CH_2$—O—$CH_2$— and —O—$CH_2$—.

The following compounds are preferable as a compound possessing a polymerizable alkenyl group and at least one other alkenyl group because of their availability:

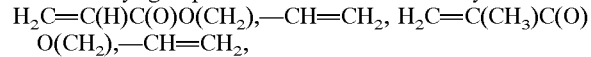

(wherein n is an integer from 0 to 20)

$H_2C=C(H)C(O)O(CH_2)n—O—(CH_2)$,CH=$CH_2$,
$H_2C=C(CH_3) C(O)O(CH_2)n—O—(CH_2)mCH=CH_2$,
(wherein n is an integer from 1 to 20; m is an integer from 0 to 20)

o-, m-, p-divinylbenzene, o-, m-, p-$H_2C=CH—C_6H_4—CH_2CH=CH_2$,
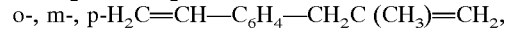
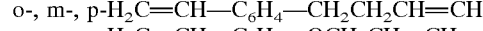
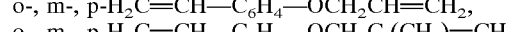
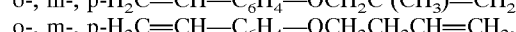
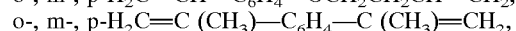
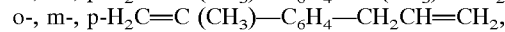
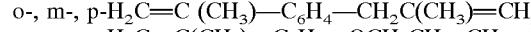
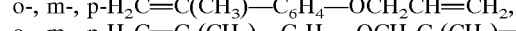
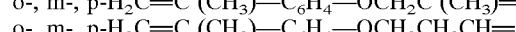
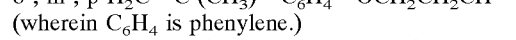
(wherein $C_6H_4$ is phenylene.)

Another process for the introduction of an alkenyl group into the chain ends of the (meth)acrylic polymer is the direct substitution of the chain end halogen atoms of formula (1) upon treatment with an alkenyl group-containing organometallic compound. Examples of such organometallic compounds include: organolithium compounds, organosodium compounds, organomagnesium compounds such as Grignard reagents, organotin compounds, organozinc compounds, organocopper compounds and the like. Among them, organotin compounds and organocopper compounds are preferred since they react selectively with halogen atoms and the ester groups of the (meth)acrylic polymer remain unattacked.

A representative example of the organotin compound which is suitable for the practice of the present invention is, but is not limited to, the compound of formula (3):

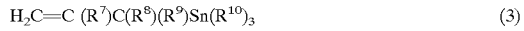

(wherein each of $R^7$, $R^8$, and $R^9$ is independently hydrogen or a $C_{1-10}$ alkyl, $C_{6-10}$ aryl, or $C_{7-10}$ aralkyl; $R^{10}$ is a $C_{1-10}$ alkyl, $C_{6-10}$ aryl, or $C_{7-10}$ aralkyl.)

Examples of the compounds of formula (3) include: allyltributyltin, allyltrimethyltin, allyltri(n-octyl)tin, allyltricyclohexyltin and the like. An alkenyl group-containing -organotin compound of formula (3) reacts with the chain end halogen atoms of formula (1) in a radical mechanism. Therefore, it may either be added during the polymerization or be reacted after the (meth)acrylic polymer is isolated. In the latter case, although the reaction proceeds just by heating, a radical initiator such as azobisisobutylonitrile may be added to accelerate the reaction.

Examples of the alkenyl group-containing organocopper compound include divinylcopper lithium, diallylcopper lithium, diisopropenylcopper lithium and the like.

Another process for the introduction of alkenyl groups into the chain end of the (meth)acrylic polymer comprises (i) the conversion of the chain end of formula (1) into an enolate anion by treatment with a metal or an organometallic compound, followed by (ii) the reaction with an alkenyl group-containing electrophile.

Examples of the above metals include alkali metals such as lithium, sodium and potassium, alkaline earth metals such as magnesium and calcium, aluminum and zinc. Among them, zinc is particularly preferable since zinc enolate which results from the treatment of the chain end with zinc causes no side reaction such as a nucleophilic attack on the ester groups or a rearrangement reaction. Examples of the above organometallic compounds include organolithium compounds, organosodium compounds, organopotassium compounds, organomagnesium compounds such as Grignard reagents and organoaluminum compounds. Among them, organolithium compounds and organomagnesium compounds are preferable because of the effective conversion of the chain end into enolate anions.

The above alkenyl group-containing electrophiles include, for example, alkenyl group-containing compounds possessing a leaving group such as halogen and acetyl group, alkenyl group-containing carbonyl compounds, alkenyl group-containing isocyanate compounds and alkenyl group-containing acid halide compounds. Among them, alkenyl group-containing compounds possessing a leaving group such as halogen and acetyl group are preferable since no heteroatom is incorporated into the main chain and thus, the weatherability of the (meth)acrylic polymer is not sacrificed.

Among the above mentioned leaving group-containing alkenyl compounds, the following are preferable because of their high reactivity: vinyl chloride, vinyl bromide, vinyl iodide, isopropenyl chloride, isopropenyl bromide, isopropenyl iodide, allyl chloride, allyl bromide, allyl iodide, 3-chloro-1-butene, 0.4.3-bromo-1-butene, 3-iodo-1-butene, 3-chloro-2-methyl-1-propene, 3-bromo-2-methyl-1-propene, 3-iodo-2-methyl-1-propene, allyl acetate, 3-acetoxy-1-butene, 3-acetoxy-2-methyl-1-propene, 4-vinylbenzyl chloride, 4-allylbenzyl chloride, 4-vinylbenzyl bromide and 4-allylbenzyl iodide. Among them, allyl chloride, allyl bromide, allyl iodide and allyl acetate are even more preferable because of their availability.

In the above mentioned process for preparing (meth) acrylic polymers having alkenyl groups at the chain ends, which comprises (i) the conversion of the chain end of the general formula (1) into an enolate anion by treatment with a metal or an organometallic compound, followed by (ii) the reaction with an alkenyl group-containing electrophile, the preferable combination of the reagents consists of zinc metal and a leaving group-containing alkenyl compound. To enhance the reactivity of such reactions, various kinds of catalysts can be used. Examples of such catalysts include monovalent copper compounds such as copper (I) chloride and copper (I) bromide, divalent copper compounds such as copper (II) diacetylacetonate, zerovalent nickel compounds such as tetrakistriphenylphosphine nickel (Ni(PPh$_3$)$_4$) and zerovalent palladium compounds such as tetrakistriphenylphosphine palladium (Pd(PPh$_3$)$_4$).

Another process for preparing (meth)acrylic polymers having alkenyl groups at the chain ends comprises:
 (i) the conversion of the chain end halogen atoms of formula (1) into a hydroxyl group-containing substituent and;
 (ii) the transformation of the hydroxyl group into an alkenyl group-containing substituent.

Various methods can be used for the conversion of the chain end halogen atoms of formula (1) into a hydroxyl group-containing substituent. An example of such methods is the reaction of a (meth)acrylic polymer having the chain end structure of formula (1) with a compound possessing a polymerizable alkenyl group and a hydroxyl group. The other processes for such conversion include: the conversion of the chain end of formula (1) into an enolate anion by treatment with a metal or an organometallic compound, followed by the reaction with carbonyl compounds such as aldehydes and ketones; substitution of the chain end halogens using alkali metal hydroxides such as sodium hydroxide and potassium hydroxide, or polyol compounds.

Polymerization of a (meth)acrylate monomer using a hydroxyl group-containing halogenated compound as an initiator and a metal complex catalyst wherein the central metal atom is selected from the group consisting of the elements of Groups 8, 9, 10 and 11 of the periodic table gives a (meth)acrylic polymer having a hydroxyl group at one end and a halogen atom of formula (1) at the other end. The conversion of the halogen-containing chain end into a hydroxyl group-containing substituent can be realized by the aforementioned methods to give a (meth)acrylic polymer having hydroxyl groups at both ends.

Furthermore, a (meth)acrylic polymer having hydroxyl groups at both ends can be prepared by the coupling reaction of a (meth)acrylic polymer having a hydroxyl group at one end and a halogen atom of formula (1), using a compound having more than one functional group, which may be the same or different, capable of substituting for the halogen of formula (1).

Various methods can be used for the conversion of the hydroxyl groups into alkenyl group-containing substituents. Examples include: the reaction using an alkenyl group-containing halogenated compound such as allyl chloride and a strong base such as sodium methoxide, the reaction using an alkenyl group-containing isocyanate compound such as allyl isocyanate, the reaction using an alkenyl group-containing acid halide such as (meth)acryloyl chloride in the presence of a base such as pyridine, and the reaction with an alkenyl group-containing acid such as (meth)acrylic acid in the presence of acid catalyst such as p-toluenesulfonic acid.

Polymerization of (meth)acrylate monomers using an alkenyl group-containing halogenated compound as an initiator and a metal complex catalyst wherein the central metal atom is selected from the group consisting of the elements of Groups 8, 9, 10 and 11 of the periodic table gives a (meth)acrylic polymer having an alkenyl group at one chain end and a halogen-containing group of formula (1) at the other chain end. Conversion of the halogen atom into an alkenyl group-containing substituent gives a (meth)acrylic polymer having alkenyl groups at both ends.

A representative example of the above mentioned alkenyl group-containing halogenated compound is the compound of formula (4):

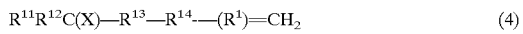

(wherein $R^1$ is hydrogen or methyl; each of $R^{11}$ and $R^{12}$ is independently hydrogen, a monovalent $C_{1-20}$alkyl, $C_{6-20}$ aryl, or$C_{7-20}$ aralkyl or $R^{11}$ and $R^{12}$ may joint to form a cyclic structure; $R^{13}$ is —C(O)O—, —C(O)—, or o-, m-, p-phenylene; $R^{14}$ is a direct bond rf or a $C_{1\cdot 20}$ divalent organic group which may contain at least one ether oxygen; X is chlorine, bromine or iodine).

In the compounds of formula (4), the carbon-halogen bond is activated by the adjacent carbonyl or phenyl group and thus is capable of initiating the polymerization.

Examples of $R^{11}$ and $R^{12}$ include hydrogen, methyl, ethyl, n-propyl, isopropyl, n-butyl, n-pentyl, n-hexyl and the like. $R^{11}$ and $R^{12}$ may joint to form a cyclic structure, and in such a case, —$R^{11}$—$R^{12}$— is, for example, —$CH_2$—$CH_2$—, —$(CH_2)_3$—, —$(CH_2)_4$— and —$(CH_2)_5$—.

The following are the examples of the compound of formula (4):
$XCH_2C(O)O(CH_2)_nCH=CH_2$, $H_3CC(H)(X)C(O)O(CH_2)_nCH=CH_.$,
$(H_3C)_2C(X)C(O)O(CH_2)_nCH=CH_2$, $CH_3CH_2C(H)(X)C(O)O(CH_2)_nCH=CH_2$,

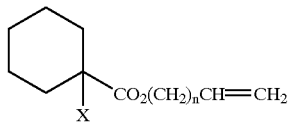

(wherein X is chlorine, bromine or iodine; n is an integer from 0 to 20)
$XCH_2C(O)O(CH_2)_nO(CH_2)_nCH=CH_2$, $H_3CC(H)(X)C(O)O(CH_2)_nO(CH_2)_nCH=CH_2$,
$(H_3C)_2C(X)C(O)O(CH_2)O(CH_2)_mCH=CH_2$,
$CH_3CH_2C(H)(X)C(O)O(CH_2)_n—(CH_2)_nCH=CH_2$,

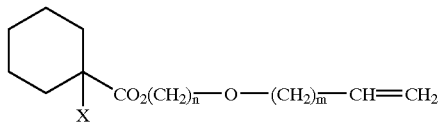

(wherein X is chlorine, bromine or iodine; n is an integer from 1 to 20; m is an integer from 0 to 20)
o-, m-, p-$XCH_2$—$C_6H_4(CH_2)_n$—$CH=CH_2$,
o-, m-, p-$CH_3C(H)(X)$—$C_6H_4$—$(CH_2)_n$—$CH=CH_2$,
$CH_3CH_2C (H)(X)$—$C_6H_4$—$(Cl_2)_m$—$CH=CH_2$,
(wherein X is chlorine, bromine or iodine; n is an integer from 0 to 20)
a-, M-, p-$XCH_2$—$C_6H_4$—$(CH_2)_nO$— $(CH_2)CH=CH_2$,
o-, M-, p-$CHCH_2C(H)(X)$—$C_6H_4$—$(CH_2)_n$—O—$(CH_2)_m$—$CH=CH_2$,
(wherein X is chlorine, bromine or iodine; n is an integer from 1 to 20; m is an integer from 0 to 20)
o-, m-, p-$XCH_2$—$C_6H_4$—O—$(CH_2)_n$—$CH=CH_2$,
o-, m-, p-$CH_3C (H)(X)$—$C_6H_4$—O—$(CH_2)_n$—$CH=CH_2$,
o-, m-, p-$CH_3CH_2C(H)(X)$—$C_6H_4$—O—$(CH_2)_n$—$CH=CH_2$,
(wherein X is chlorine, bromine or iodine; n is an integer from 0 to 20)
o-, m-, p-$XCH_2$—$C_6H_4$—O—$(CH_2)_n$—O— $(CH_2)_m$—$CH=CH_2$,
o-, m-, p-$CH_3C(H)(X)$—$C_6H_4$—O—$(CH_2)_n$—$(CH_2)_m$—$CH=CH_2$,
o-, m-, p-$CH_3CH_2C(H)(X)$—$C_6H_4$—O—$(CH_2)_n$—O—$(CH_2)_m$—$CH=CH_2$,
(wherein X is chlorine, bromine or iodine; n is an integer from 1 to 20; m is an integer from 0 to 20.)

Another example of the above mentioned alkenyl group-containing halogenated compound is the compound of formula (5):

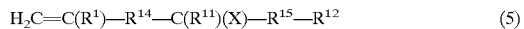

(wherein $R^1$, $R^{11}$, $R^{12}$, $R^{14}$, and X are as defined in formula (4);
$R^{15}$ is a direct bond, —C(O)O—, —C(O)—, or o-, m-, p-phenylene)
$R^{14}$ is a direct bond or a $C_{1-20}$ divalent organic group which may contain at least one ether oxygen. When $R^{14}$ is a direct bond, the carbon-halogen bond is activated by the adjacent vinyl group. In such a case, $R^{15}$ need not be —C(O)O— or phenylene and may be a direct bond. When $R^{14}$ is not a direct bond, $R^{15}$ is preferably —C(O)O— or phenylene to activate the carbon-halogen bond.

The following are the examples of the compound of formula (5):
$CH_2=CHCH_2X$, $CH_2=C(CH_3)CH_2X$, $CH_2=CHC(H)(X)CH_3$,
$CH_2=C(CH_3)C(H)(x)CH_3$, $CH_2=CHC(X)(CH_3)_2$,
$CH_2=CHC(H)(X)C_2H_5$,
$CH_2=CHC(H)(X)CH(CH_3)_2$, $CH_2=CHC(H)(X)C_6H_5$,
$CH_2=CHC(H)(X)CH_2C_6H_5$,
$CH_2=CHCH_2C(H)(X)$—$CO_2R$, $CH_2=CH(CH_2)_2C(H)(X)$—$CO_2R$,
$CH_2=CH(CH_2)_3C(H)(X)$—$CO_2R$, $CH_2=CH(CH_2)_8C(H)(X)$—$CO_2R$,
$CH_2=CHCH_2C(H)(X)$—$C_6H_5$, $CH_2=CH(CH_2)_2C(H)(X)$—$C_6H_5$,
$CH_2=CH (CH_2)_3C (H) (X)$—$C_6H_5$
(wherein X is chlorine, bromine or iodine; R is a $C_{1-20}$ alkyl, $C_{6-20}$ aryl or $C_{7-20}$ aralkyl.)

Examples of the alkenyl group-containing halosulfonyl compounds are:
o-, m-, p-$CH_2=CH$—$(CH_2)_n$—$C_6H_4$—$SO_2X$,
o-, m-, p-$CH_2=CH$—$(CH_2)_n$—O—$C_6H_4$—$SO_2X$
(wherein X is chlorine, bromine or iodine; n is an integer from 0 to 20.)

When a (meth)acrylate monomer is polymerized using an halkenyl group-containing halogenated compound as an initiator and a metal complex catalyst wherein the central metal atom is selected from the group consisting of the elements of Groups 8, 9, 10 and 11 of the periodic table, a (meth)acrylic polymer having an alkenyl group at one chain end and a halogen-containing group of formula (1) at the other chain end is obtained. The conversion of the halogen-containing chain end into an alkenyl group-containing substituent is accomplished by any one of the aformentioned methods.

A (meth) acrylic polymer having alkenyl groups at both ends can also be prepared by the chain end coupling reaction of a (meth)acrylic polymer having an alkenyl group at one chain end and a halogen-containing group of formula (1) at the other chain, end, using a compound having more than one functional group, which may be the same or different, capable of substituting for the halogen of formula (1).

Compounds having more than one functional group, which may be the same or different, capable of substituting for the halogen of formula (1), which are suitable for the practice of the present invention are, but are not limited to, polyols, polyamines, polycarboxylic acids, polythiols, or their alkali metal salts, or alkali metal sulfides. Examples of such compounds include the following: ethylene glycol, 1,2-propanediol, 1,3-propanediol, 2-methyl-1,3-propanediol, 2,2-dimethyl-1,3-propanediol, 1,4-butanediol, 1,3-butanediol, 1,2-butanediol, 2,3-butanediol, pinacol, 1,5-pentanediol, 1,4-pentanediol, 2,4-pentanediol, 1,6-hexanediol, 1,7-heptanediol, 1,8-octanediol, 1,9-nonanediol, 1,10-decanediol, 1,12-dodecanediol, 1,2-cyclopentanediol, 1,3-cyclopentanediol, 1,2-cyclohexanediol, 1,3-cyclohexanediol, 1,4-cyclohexanediol, glycerol, 1,2,4-butanetriol, catechol, resorcinol, hydroquinone, 1,2-dihydroxynaphthalene, 1,3-dihydroxynaphthalene, 1,5-dihydroxynaphthalene, 2,6-dihydroxynaphthalene, 2,2'-biphenol, 4,41-biphenol, bis(4-hydroxyphenyl)methane, 4,4'-isopropylidenephenol, 3,3'-(ethylenedioxy)diphenol, α,α'-dihydroxy-p-xylene, 1,1,1-tris(4-hydroxyphenyl)ethane, pyrogallol, 1,2,4-benzenetriol and the alkali metal salts of the above compounds; ethylenediamine, 1,3-diaminopropane, 1,2-diaminopropane, 1,4-diaminobutane, 1,2-diamino-2-methylpropane, 1,5-diaminopentane, 2,2-dimethyl-1,3-propanediamine, 1,6-hexanediamine, 1,7-heptanediamine, 1,8-octanediamine, 1,9-diaminononane, 1,10-diaminodecane, 1,12-diaminododecane, 4,4,-methylenebis(cyclohexylamine), 1,2-diaminocyclohexane, 1,3-diaminocyclohexane, 1,4-diaminocyclohexane, 1,2-phenylenediamine, 1,3-phenylenediamine, 1,4-phenylendiamine, α,α'-diamino-p-xylene and the alkali metal salts of the above compounds; oxalic acid, malonic acid, methylmalonic acid, dimethylmalonic acid, succinic acid, glutaric acid, adipic acid, 1,7-heptanedicarboxylic acid, 1,8-octanedicarboxylic acid, 1,9-nonanedicarboxylic acid, 1,10-decanedicarboxylic acid, 1,11-undecanedicarboxylic acid, 1,12-dodecanedicarboxylic acid, 1,2-cyclopentanedicarboxylic acid, 1,2-cyclohexanedicarboxylic acid, 1,3-cyclohexanedicarboxylic acid, 1,4-cyclohexanedicarboxylic acid, 1,3,5-cyclohexanetricarboxylic acid, phthalic acid, isophthalic acid, terephthalic acid, 1,2,3-benzenetricarboxylic acid, 1,2,4,5-benzenetetracarboxylic acid and the alkali metal salts of the above compounds; 1,2-ethanedithiol, 1,3-propanedithiol, 1,4-butanedithiol, 2,3-butanedithiol, 1,5-pentanedithiol, 1,6-hexanedithiol, 1,7-heptanedithiol, 1,8-octanedithiol, 1,9-nonanedithiol, 2-mercaptoethylether, p-xylene-α,α'-dithiol, 1,2-benzene-dithiol, 1,3-benzenedithiol, 1,4-benzenedithiol and the alkali metal salts of the above compounds; lithium sulfide, sodium sulfide and potassium sulfide.

When using polyols, polyamines, polycarboxylic acids and polythiols, an adequate base is also used to enhance the reactivity. Examples of such bases are lithium, sodium, potassium, sodium carbonate, potassium carbonate, sodium bicarbonate, sodium methoxide, potassium methoxide, sodium-tert-butoxide, potassium-tert-butoxide, sodium hydride and potassium hydride.

A (meth) acrylic polymer having alkenyl groups at the chain ends prepared according to the above-mentioned methods can be used as a main component of a curable composition. Such curable composition comprises: (A) a (meth)acrylic polymer having alkenyl groups at the chain ends prepared according to one of the methods described above and (B) a polyvalent hydrogensilicon compound.

The component (A) can be composed either of only one polymer or of more than one polymer. The molecular weight of the component (A) is preferably, but is not limited to, from 500 to 50,000. When the molecular weight of the component (A) is less than 500, the cured product thereof does not exhibit sufficient physical properties which are inherent to (meth)acrylic polymers. When the molecular weight of the component (A) is larger than 50,000, the polymer becomes too viscous or hardly soluble and thus, difficult to handle.

The component (B), a polyvalent hydrogensilicon compound, is not limited.

Representative examples of the component (B) are straight chain polysiloxanes of formula (9) or (10),

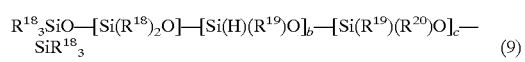
(9)

(10)

(wherein each of $R^{18}$ and $R^{19}$ is independently a $C_{1-6}$ alkyl or phenyl; $R^{20}$ is a $C_{1-10}$ alkyl or $C_{7-10}$, aralkyl; a is an integer from 0 to 100, b is an integer from 2 to 100, C is an integer from 0 to 100); cyclic polysiloxanes of formula (11)

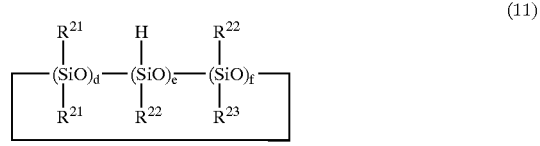
(11)

(wherein each of $R^{21}$ and $R^{22}$ is $C_{1-6}$ alkyl or phenyl; $R^{23}$ is $C_{1-10}$ alkyl or $C_{7-10}$ aralkyl; d is an integer from 0 to 8; e is an integer from 2 to 10; f is an integer from 0 to 8, provided that $3 \leq d+e+f \leq 10$.)

The component (B) can be composed either of only one compound or of more than one compound.

Among such polyvalent hydrogensilicon compounds, the straight chain polysiloxanes having a phenyl group depicted in formula (12) and (13), and the cyclic polysiloxanes of formula (14) and (15) are preferable in view of the compatibility with the component (A).

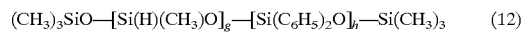
(12)

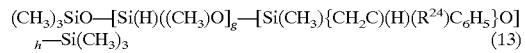
(13)

(wherein $R^{24}$ is hydrogen or methyl; g is an integer from 2 to 100; h is an integer from 0 to 100, $C_6H_5$ is phenyl);

(14)

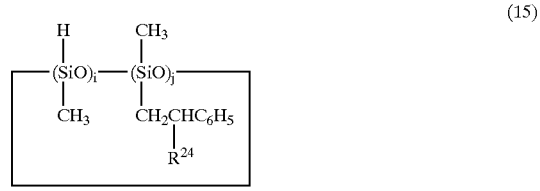
(15)

(wherein $R^{24}$ is hydrogen or methyl; i is an integer from 2 to 10; j is an integer from 0 to 8 provided that $3 \leq i+j \leq 10$.)

Further examples of the component (B) are the compounds which are prepared by addition reaction of a polyvalent hydrogensilicon compound of formula 9-15 with a low molecular weight compound possessing more than one alkenyl group so that a portion of the hydrosilyl groups remains unconsumed after the reaction.

Specific examples of the compound possessing more than one alkenyl group are hydrocarbon compounds such as 1,4-pentadiene, 1,5-hexadiene, 1,6-heptadiene, 1,7-octadiene, 1,8-nonadiene and 1,9-decadiene, ether compounds such as α,α'-diallylbisphenol A and 3,3'-diallylbisphenol A, ester compounds such as diallyl phthalate, diallyl isophthalate, triallyl trimellitate and tetraallyl pyromellitate, carbonate compounds such as diethyleneglycol diallyl carbonate.

A polyvalent hydrogensilicon compound can be prepared by adding an above-mentioned alkenyl compound slowly to an excess amount of a polyvalent hydrogensilicon compound of formula 9-15 in the presence of a hydrosilation catalyst. Among the polyvalent hydrogensilicon compounds which can be prepared by the above method, the following are particularly preferable in view of the availability of the starting materials, easy removal of the excess hydrogensilicon compound after the reaction, and the compatibility with the component (A).

hexane, 2,5-dimethyl-2,5-di(tert-butylperoxy)-3-hexyne, dicumylperoxide, tert-butyl-cumylperoxide and α,α'-bis(tert-butylperoxy)isopropylbenzene; diacyl-peroxides such as benzoylperoxide, p-chlorobenzoylperoxide, m-chlorobenzoylperoxide, 2,4-dichlorobenzoylperoxide and lauroylperoxide; peracid esters such as tert-butyl perbenzoic acid; peroxydicarbonates such as diisopropyl perdicarbonate and 2-ethylhexyl perdicarbonate; peroxyketals such as 1,1-di(tert-butylperoxy)cyclohexane and 1,1-di(tert-butylperoxy)-3,3,5-trimethylcyclohexane.

Examples of transition metal complexes which can be used as a hydrosilation catalyst are platinum metal; solid platinum supported on a carrier such as alumina, silica or carbon black; chloroplatinic acid; a complex of chloroplatinic acid with an alcohol, an aldehyde or a ketone; a platinum-olefin complex; and platinum(0)-divinyltetramethylsiloxane complex. Examples of the catalyst other than platinum compounds are $RhCl(PPh_3)_3$, $RhCl_3$, $RuCl_3$, $IrCl_3$, $FeCl_3$, $AlCl_3$, $PdCl_2H_2O$, $NiCl_2$ and $TiCl_4$.

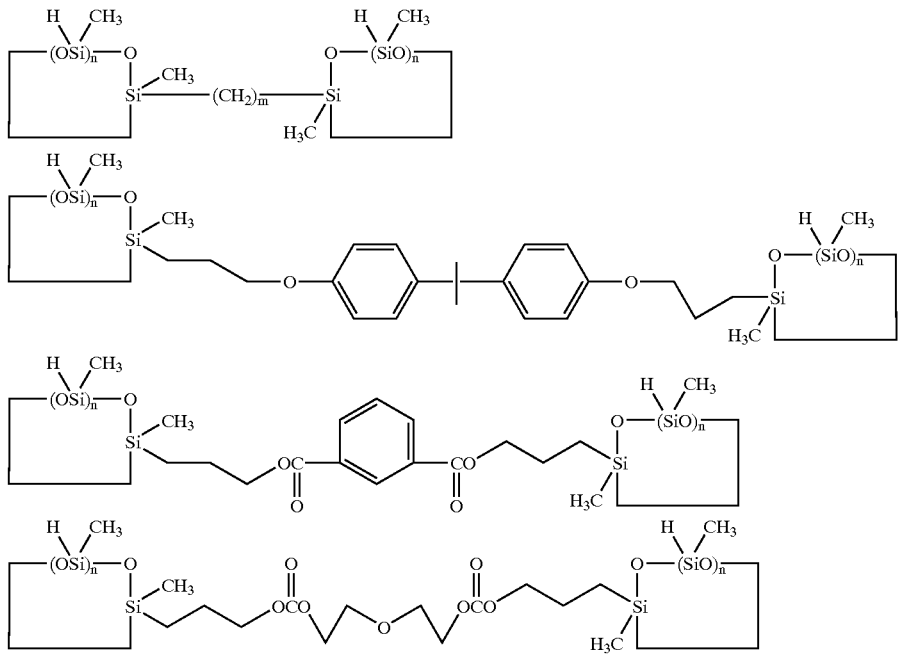

(wherein n is an integer from 2 to 4; m is an integer from 5 to 10.)

The molar ratio of the alkenyl group in the component (A) to the hydrosilyl group in the component (B) is preferably from 5 to 0.2, more preferably from 2.5 to 0.4, in view of the mechanical properties of the curing material. When the molar ratio is larger than 5, the curing is insufficient and only a sticky cured material having low strength is obtained. When the molar ratio is smaller than 0.2, cracking and voids often occur and a homogeneous cured material having high strength cannot be obtained since many active hydrosilyl groups remain in the cured material.

The curing reaction of the component (A) and (B) proceeds just by heating. However, a hydrosilation catalyst is often added to speed up the curing. Various radical initiators such as organic peroxides and azo compounds, and transition metal complexes are used as a hydrosilation catalyst.

Examples of radical initiators which can be used as a hydrosilation catalyst are: dialkylperoxides such as di-tert-butylperoxide, 2,5-dimethyl-2,5-di(tert-butylperoxy)-

One of these catalysts may be used or a combination of at least two of these catalysts may be used. The catalyst amount is not limited, but it is preferably from $10^{-1}$ to $10^{-8}$ moles based on 1 mole of the alkenyl group of the component (A), $10^{-3}$ to $10^{-6}$ being more preferable. When the catalyst amount is smaller than $10^{-8}$, the curing is insufficient. Since the hydrosilation catalysts are expensive, their use in an amount greater than $10^{-1}$ is not preferable.

The homogeneously cured material having good depth curability without a phenomenon such as foaming can be obtained by mixing the components (A), (B) and a hydrosilation catalyst if necessary and then curing the composition. Curing conditions are not limited, but curing is generally carried out at 0 to 200° C., preferably 30 to 150° C. for 10 seconds to 24 hours. In particular, at a high temperature of 80 to 150° C., the curing is sometimes completed in a short period from 10 seconds to 1 hour. The properties of the cured material depend on the molecular structure and the molecular weight of the components (A) and (B), and a rubbery material to a resinous material can be obtained. Examples of applications of the curing materials obtained from the above mentioned curing composition include, but are not limited to, sealants, adhesives, pressure sensitive adhesives, elastic adhesives, paints and coatings, powder coatings, foams, potting agents for electronics devices, films, gaskets, moulded articles and artificial marbles.

Next, a (meth)acrylic polymer having curable silyl groups at the chain ends can be prepared in a manner similar to the preparation of a (meth)acrylic polymer having alkenyl groups at the chain ends. Thus it can be prepared by a process which comprises the steps of:

(i) preparing a (meth)acrylic polymer having a chain end structure of formula (1) by polymerizing (meth) acrylate monomers using an organohalogenated compound or a halosulfonyl compound as an initiator and a metal complex catalyst wherein the central metal atom is selected from the group consisting of the elements of Groups 8, 9, 10 and 11 of the periodic table; and (ii) converting the halogen atom in the structure of formula (1) into a curable silyl group-containing substituent.

A first example of such transformation is the reaction of a (meth)acrylic polymer obtained by the above mentioned polymerization with a compound having a polymerizable alkenyl group and a curable silyl group as a second monomer. This method is based on the same principle which was explained in the process for the preparation of a (meth) acrylic polymer having alkenyl groups at the chain ends. Also in this case, the second monomer may be added together with a catalyst after the isolation of a (meth) acrylic polymer, or may be added during the polymerization. In the latter case, the second monomer should be added after a large amount, preferably more than 80%, of the first (meth) acrylate monomer is consumed. Otherwise, the (meth) acrylic polymer would have curable silyl groups at side chains, not at the chain ends, and thus, the cross-linked product thereof would exhibit poor mechanical properties.

Addition of an amount of the above compound (the second monomer) equal to the number of chain end (which, in turn, is equal to the number of initiating sites) is sufficient to introduce a curable silyl group into all the chain ends. However, the addition of an excess amount, preferably 1–5 times the number of the chain end, is preferred in order to secure the introduction of a curable silyl group into all the chain ends. Addition of the second monomer in an amount greater than 5 times the number of the chain end is not preferable since the curable silyl group is introduced densely onto the chain ends and thus, the cross-linked product thereof would exhibit poor mechanical properties.

Representative examples of the compounds possessing a polymerizable alkenyl group and a curable silyl group, which are suitable for use in the practice of this invention are, but are not limited to, the compound of formula (6)

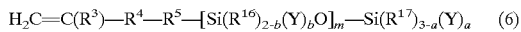

(wherein $R^3$, $R^4$, and $R^5$ are as defined in formula 2; each of $R^{16}$ and $R^{17}$ is independently a $C_{1-20}$ alkyl, $C_{6-20}$ aryl, $C_{7-20}$ aralkyl, or a triorganosiloxy group represented by $(R')_3SiO-$, wherein R' is a monovalent $C_{1-20}$ alkyl, $C_{6-20}$ aryl, or $C_{7-20}$ aralkyl group, and the three R' groups may be the same or different; each of the $R^6$ group may be the same or different when more than one $R^{16}$ is present, and each of the $R^{17}$ group may be the same or different when more than one $R^{17}$ is present; Y is hydroxyl or a hydrolyzable group, and may be the same or different when more than one Y group is present; a is 0, 1, 2 or 3; b is 0, 1 or 2; m is an integer from 0 to 19 provided that $a+mb \geqq 1$)

When $R^4$ is $-C(O)O-$ (ester), the compound of formula (6) is a (meth)acrylate derivative, and when $R^4$ is phenylene, it is a styrene derivative.

The hydrolyzable group Y is not specifically limited and §7; may be a known hydrolyzable group. Specific examples of the group Y are a hydrogen atom, a halogen atom, an alkoxy group, an acyloxy group, a ketoximate group, an amino group, an amido group, an aminooxy group, a mercapto group, an alkenyloxy group and the like. The alkoxy group is particularly preferable since its hydrolyzability is mild and it is easy to handle. This hydrolyzable group or hydroxyl group may be bonded to one silicon atom in a number of 1–3, and (a+mb), namely the sum of the hydrolyzable group, is preferably in the range of 1 to 5. When more than one hydrolyzable group or hydroxyl group are attached to a silicon atom, they may be the same or different. The number of silicon atoms contained in this reactive silyl group may be one or more than one, and if the silicon atom is linked in a siloxane bond, the number may be up to 20.

Examples of $R^{16}$ and $R^{17}$ of formula (6) include alkyl groups such as methyl and ethyl; aryl groups such as phenyl; cycloalkyl groups such as cyclohexyl; aralkyl groups such as benzyl, triorganosilyl groups $((R')_3SiO-)$ wherein R' is methyl and phenyl.

In view of the mild reactivity of their hydrolyzable silyl group and their availability, the following compounds are preferable as the compounds of formula (6):

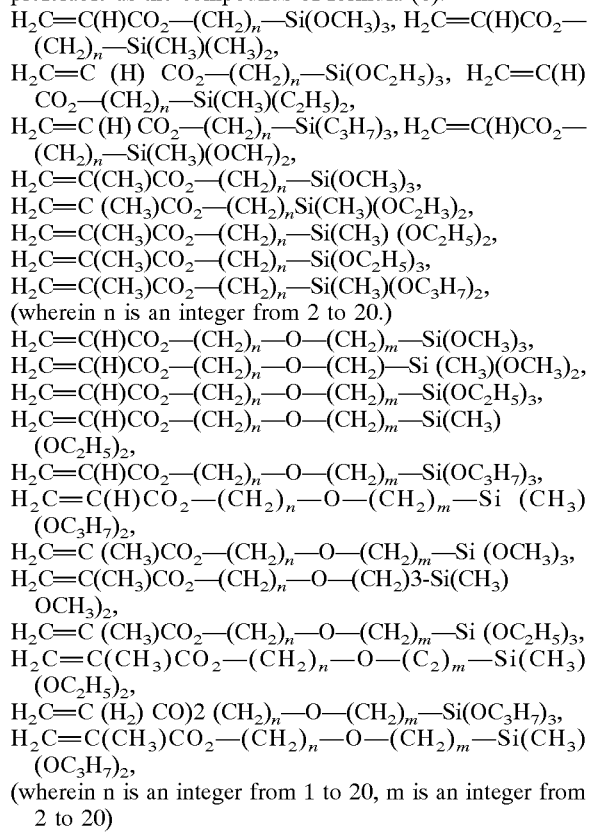

(wherein n is an integer from 2 to 20.)

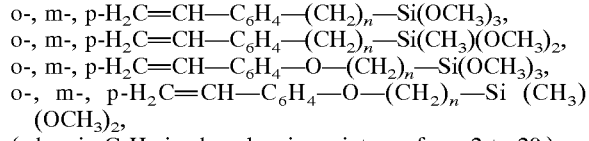

(wherein n is an integer from 1 to 20, m is an integer from 2 to 20)

o-, m-, p-$H_2C=CH-C_6H_4-(CH_2)_n-Si(OCH_3)_3$,
o-, m-, p-$H_2C=CH-C_6H_4-(CH_2)_n-Si(CH_3)(OCH_3)_2$,
o-, m-, p-$H_2C=CH-C_6H_4-O-(CH_2)_n-Si(OCH_3)_3$,
o-, m-, p-$H_2C=CH-C_6H_4-O-(CH_2)_n-Si(CH_3)(OCH_3)_2$, (wherein $C_6H_4$ is phenyl, n is an integer from 2 to 20.)

Polymerization of a (meth)acrylate monomer using a curable silyl group-containing halogenated compound as an initiator and a metal complex catalyst wherein the central metal atom is selected from the group consisting of the elements of Groups 8, 9, 10, and 11 of the periodic table gives a (meth)acrylic polymer having a curable silyl group at one chain end and a halogen-containing group of formula (1) at the other chain end. Conversion of the halogen atom into a curable silyl group-containing substituent gives a (meth)acrylic polymer having curable silyl groups at both ends. The methods described above can be used for such conversion.

A representative example of the above mentioned curable silyl group-containing halogenated compound is the compound of the general formula (7):

$$R^{11}R^{12}C(X)-R^{13}-R^{14}-C(H)(R^1)CH_2-[Si(R^{16})_{2-b}(Y)_bO]_m-Si(R^{17})_{3-a}(Y)_a \qquad (7)$$

(wherein $R^1$, $R^{11}$, $R^{12}$, $R^{13}$, $R^{14}$ and X are as defined in formula (4); $R^{16}$, $R^{17}$, a, b, m, and Y are as defined in formula (6).)

Specific examples of the compounds of formula (7) include;

$XCH_2C(O)O(CH_2)_nSi(OCH_3)_3$, $CH_3C(H)(X)C(O)O(CH_2)_nSi(OCH_3)_3$,
$(CH_3)_2C(X)C(O)O(CH_2)_nSi(OCH_3)_3$,
$XCH_2C(O)O(CH_2)_nSi(CH_3)(OCH_3)_2$,
$CH_3C(H)(X)C(O)O(CH_2)_nSi(CH_3)(OCH_3)_2$,
$(CH_3)_2C(X)C(O)O(CH_2)_nSi(CH_3)(OCH_3)_2$,
(wherein X is chlorine, bromine or iodine; n is an integer from 0 to 20)

$XCH_2C(O)O(CH_2)_nO(CH_2)_mSi(OCH_3)_3$,
$CH_3C(H)(X)C(O)O(CH_2)_nO(CH_2)_mSi(OCH_3)_3$,
$(CH_3)_2C(X)C(O)O(CH_2)_nO(CH_2)_mSi(OCH_3)_3$,
$XCH_2C(O)O(CH_2)_nO(CH_2)_mSi(CH_3)(OCH_3)_2$,
$CH_3C(H)(X)C(O)O(CH_2)_nO(CH_2)_mSi(CH_3)(OCH_3)_2$,
$(CH_3)_2C(X)C(O)O(CH_2)_nO(CH_2)_mSi(CH_3)(OCH_3)_2$,
(wherein X is chlorine, bromine or iodine; n is an integer from 1 to 20; m is an integer from 0 to 20)

o-, m-, p-$XCH_2-C_6H_4-(CH_2)_2Si(OCH_3)_3$,
o-, m-, p-$CH_3C(H)(X)-C_6H_4-(CH_2)_2Si(OCH_3)_3$,
o-, m-, p-$CH_3CH_2C(H)(X)-C_6H_4-(CH_2)_2Si(OCH_3)_3$,
o-, m-, p-$XCH_2-C_6H_4-(CH_2)_3Si(OCH_3)_3$,
o-, m-, p-$CH_3C(H)(X)-C_6H_4-(CH_2)_3Si(OCH_3)_3$,
o-, m-, p-$CH_3CH_2C(H)(X)-C_6H_4-(CH_2)_3Si(OCH_3)_3$,
o-, m-, p-$XCH_2-C_6H_4-(CH_2)_2-O-(CH_2)_3Si(OCH_3)_3$,
o-, m-, p-$CH_3C(H)(X)-C_6H_4-(CH_2)_2-O-(CH_2)_3Si(OCH_3)_3$,
o-, m-, p-$CH_3CH_2C(H)(X)-C_6H_4-(CH_2)_2-O(CH_2)_3Si(OCH_3)_3$,
o-, m-, p-$XCH_2-C_6H_4-O-(CH_2)_3Si(OCH_3)_3$,
o-, m-, p-$CH_3C(H)(X)-C_6H_4-O-(CH_2)_3Si(OH_2)_3$,
o-, m-, p-$CH_3CH_2C(H)(X)-C_6H_4-O-(CH_2)_3Si(OCH_3)_3$,
o-, m-, p-$XCH_2-C_6H_4-O-(CH_2)_2-O-(CH_2)_3Si(OCH_3)_3$,
o-, m-, p-$CH_3C(H)(X)-C_6H_4-O-(CH_2)_2-O-(CH_2)_3Si(OCH_3)_3$,
o-, m-, p-$CH_3CH_2C(H)(X)-C_6H_4-O-(CH_2)_2-O-(CH_2)_3Si(OCH_3)_3$, (wherein X is chlorine, bromine or iodine.)

The compounds of formula (8) are also examples of the curable silyl group-containing halogenated compound.

$$(R^{17})_{3-a}(Y)_aSi-[OSi(R^{16})_{2-b}(Y)b]_m-CH_2-C(H)(R^1)-R^{14}-C(R^{11})(X)-R^{15}-R^{12} \qquad (8)$$

(wherein $R^1$, $R^{11}$, $R^{12}$, $R^{14}$ and X are as defined in formula (4); $R^{15}$ is as defined in formula (5); $R^{16}$, $R^{17}$, a, b, m and Y are as defined in formula (6)).

Specific examples of the compounds of formula (8) include;

$(CH_3O)_3SiCH_2CH_2C(H)(X)C_6H_5$, $(CH_3O)_2(CH_3)SiCH_2CH_2C(H)(X)C_6H_5$,
$(CH_3O)_3Si(CH_2)_2C(H)(X)-CO_2R$, $(CH_3O)_2(CH_3)Si(CH_2)_2C(H)(X)-CO_2R$,
$(CH_3O)_3Si(CH_2)_3C(H)(X)tCO_2R$, $(CH_3O)_2(CH_3)Si(CH_2)_3C(H)(X)-CO_2R$,
$(CH_3O)_3Si(CH_2)_4C(H)(X)-CO_2R$, $(CH_3O)_2(CH_3)Si(CH_2)_4C(H)(X)-CO_2R$,
$(CH_3O)_3Si(CH_2)_9C(H)(X)-CO_2R$, $(CH_3O)_2(CH_3)Si(CH_2)_9C(H)(X)-CO_2R$,
$(CH_3O)_3Si(CH_2)_3C(H)(X)-C_6H_5$, $(CH_3O)_2(CH_3)Si(CH_2)_3C(H)(X)-CH_5$,
$(CH_3O)_3Si(CH_2)_4C(H)(X)-C_6H_5$, $(CH_3O)_2(CH_3)Si(CH_2)_4C(H)(X)-C_6H_5$, (wherein X is chlorine, bromine or iodine; R is a $C_{1-20}$ alkyl, $C_{6-20}$ aryl or $C_{7-20}$ aralkyl.)

When a (meth)acrylate monomer is polymerized using a curable silyl group-containing halogenated compound as an initiator and a metal complex catalyst wherein the central metal atom is selected from the group consisting of the elements of Groups 8, 9, 10 and 11 of the periodic table, a (meth)acrylic polymer having a curable silyl group at one chain end and a halogen-containing group of formula (1) at the other chain end is obtained. A (meth)acrylic polymer having curable silyl groups at both ends can also be prepared by the chain end coupling reaction of the above mentioned (meth)acrylic polymer using a compound having more than one functional group, which may be the same or different, capable of substituting for the halogen in the general formula (1). This method is based on the same principle which was explained above for the process of preparing a (meth)acrylic polymer having alkenyl groups at both ends. All the compounds having more than one functional group, which may be the same or different, capable of substituting for the halogen in formula (1), which are exemplified as above, can be used for the coupling reaction.

A (meth)acrylic polymer having curable silyl groups at the chain ends can also be obtained by adding a curable silyl group-containing hydrogensilicon compound to a (meth) acrylic polymer having alkenyl groups at the chain ends prepared according to the aforementioned methods. All the (meth)acrylic polymers having alkenyl groups at the chain ends, which are obtained by the methods described above, can be used for this purpose.

A representative example of a curable silyl group containing hydrogensilicon compound is the compound of formula (16):

$$H-[Si(R^{16})_{2-b}(Y)_bO]-Si(R^{17})_{3-a}(Y)_a \qquad (16)$$

(wherein $R^{16}$, $R^{17}$, Y, a, b and m are as defined in formula (6).)

Among those compounds, the compounds of formula (17) are particularly preferable in view of their availability.

$$H-Si(R^7)_{3-a}(Y)_a \qquad (17)$$

(wherein $R^{17}$, Y and a are as defined in formula (6).)

Specific examples of the compounds of formula 16 or 17 are;

$HSiCl_3$, $HSi(CH_3)_2Cl_2$, $HSi(CH_3)_2Cl$, $HSi(OCH_3)_3$, $HSi(CH_3)(OCH_3)_2$, $HSi(CH_3)_2(OCH_3)$, $HSi(OC_2H_5)_3$, $HSi(CH_3)(OC_2H_5)_2$, $HSi(CH_3)_2O_2H_5$, $HSi(OH_3H_7)_3$, $HSi(C_2H_5)(OCH_3)_2$, $HSi(C_2H_5)_2(CH_3)$, $HSi(C_6H_5)(OCH_3)_2$, $HSi(C_3H_5)_2(OH_2)$, $HSi(H_2)(OC(O)H_2)_2$, $HSi(CH_3)_2O-[Si(CH_3)_2O\ ]_2-Si(H_2)(OCH_3)_2$, $HSi(CH_3)[O-N=C(CH_3)_2]_2$ (wherein $C_6H_5$ is phenyl.)

When the addition reaction of the above hydrogensilicon compound to a (meth)acrylic polymer having alkenyl groups at the chain ends is carried out, a hydrosilation catalyst already described can be used.

A (meth)acrylic polymer having curable silyl groups at the chain ends prepared according to the above-mentioned methods can be used as a main component of a curable composition. One of these polymers may be used or a combination of at least two of these polymers may be used. The molecular weight of the polymer is preferably, but is not limited to, from 500 to 50,000. When the molecular weight of the polymer is smaller than 500, the cured product thereof does not exhibit sufficiently the physical properties which are inherent to (meth)acrylic polymers. When the molecular weight of the polymer is larger than 50,000, it becomes too viscous or hardly soluble and thus, difficult to handle.

A (meth)acrylic polymer having curable silyl groups at the chain ends cross-links upon exposure to moisture to give a cured material. The rate of hydrolysis depends on the temperature, humidity and the hydrolyzable group. Therefore, the hydrolyzable group must be carefully selected according to the conditions of use. (Meth)acrylic polymers having curable silyl groups at the chain ends must be kept protected from moisture when stored.

A curing catalyst may be used to speed up the cross-linking. The following are the representative examples of those catalysts: alkyl titanates; organosilicon titanates; carboxylic acid metal salts such as tin dioctylate and tin dilaurate; amine salts such as dibutylamine 2-ethylhexoate; and other acid or basic catalysts. The amount of these catalysts to be used is not limited but is preferably 0.05~5 parts based on 100 parts of the (meth)acrylic polymers having curable silyl groups at the chain ends.

The homogeneous cured material can be obtained from a (meth)acrylic polymer having curable silyl groups at the chain ends and a curing catalyst if necessary. Curing conditions are not limited, but the curing is generally carried out at 0 to 100° C. preferably at 10 to 50° C. for 1 hour to 1 week. The properties of the cured material depend on the molecular structure and the molecular weight of the (meth) acrylic polymer having curable silyl groups at the chain ends, and a rubbery material to a resinous material can be obtained.

The curable composition of the present invention is specifically useful as sealants, adhesives, pressure sensitive adhesives, elastic adhesives, paints and coatings, powder coatings, foams, potting agents for electronics devices, films, moulded articles and artificial marbles, but are not limited to those uses.

EXAMPLES

The following Examples further illustrate the present invention in detail but are not to be construed to limit the scope thereof.

Preparative Example 1

(Synthesis of 2-allyloxyethyl methacrylate)

To a three-necked flask equipped with a stirrer, a thermometer, a reflux condenser and a Dean-Stark apparatus were added methacrylic acid (137.7 g, 1.6 moles), ethyleneglycol monoallylether (80.7 g, 0.8 moles), p-toluenesulfonic acid (0.76 g, 4.0 mmole) and toluene (650 mL). The mixture was heated to 120° C. for 5 hours with exclusion of water. Another portion of p-toluenesulfonic acid (0.12 g) and the mixture was heated to 120° C. for 6 hours. The other portion of p-toluenesulfonic acid (0.1 g) was added and the mixture was heated to 120° C. for 9 hours. During the reaction, the consumption of methacrylic acid and ethyleneglycol monoallylether were monitored by liquid chromatography and the conversion reached 98%. The mixture was neutralized by addition of aq. $NaHCO_3$ and the layers were separated. The aqueous layer was extracted with toluene and the combined organic layers were dried over $CaCl_2$ and concentrated under reduced pressure. Distillation of the crude material (60° C. at 2 mmng) yielded 2-allyloxyethyl methacrylate (98.7 g, 73%) shown below.

Example 1

To a 30 mL pyrex tube were added butyl acrylate (2.5 mL, 2.24g, 17.45 mmole), α,α'-dibromo-p-xylene (92.5 mg, 0.35 lnmole), copper (I) bromide (50 mg, 0.35 mmole), 2,2'-bipyridyl (163 mg, 1.05 mmole), ethyl acetate (2 mL) and acetonitrile (0.5 mL). The mixture was degassed by bubbling $N_2$ for 10 minutes and then sealed. The mixture was heated to 130° C. for 1 hour. After cooling to ambient temperature, 2-allyloxyethyl methacrylate (600 mg, 3.5 mmole) prepared according to the Preparative Example 1 was added under $N_2$ atmosphere and then sealed. The mixture was heated to 80° C. for 1 hour and then was diluted with ethyl acetate (20 mL). An insoluble precipitate was filtered off and the filtrate was washed twice with dil. HCl and once with NaCl solution. The organic layer was dried over $Na_2SO_4$ and concentrated under reduced pressure to give the poly(butyl acrylate) having alkenyl groups at both ends shown below (1.97 g, 88%). The molecular weight and the molecular weight distribution of the polymer were found to be 6700 and 1.60, respectively, by GPC analysis (based on polystyrene standard). The number of alkenyl groups introduced into the polymer was 5.4 based on $^1H$ NMR analysis.

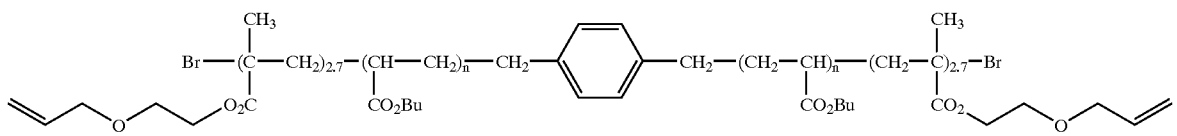

Example 2

The same procedure as Example 1 except that methyl acrylate was used instead of butyl acrylate yielded the poly(methyl acrylate) having alkenyl groups at both ends shown below (93%). The molecular weight and the molecular weight distribution of the polymer were found to be 7900 and 2.0, respectively, by GPC analysis (based on polystyrene standard). The number of alkenyl groups introduced into the polymer was 3.3 based on $^1H$ NMR analysis.

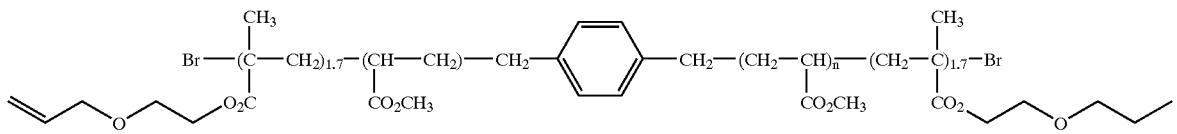

Example 3

To a 50 mL pyrex tube were added butyl acrylate (10 mL, 8.94 g, 69.8 mmole), α,α'-dibromo-p-xylene (370 mg, 1.4 mmole), copper (I) bromide (200 mg, 1.4 mmole), 2,2'-bipyridyl (433 mg, 2.8 mmole) and methylisobutyl ketone (MIBK, 10 mL). The mixture was degassed by bubbling $N_2$ for 10 minutes and then sealed. The mixture was heated to 130° C. for 20 minutes and after cooling to ambient temperature, the mixture was diluted with ethyl acetate (20 mL). An insoluble precipitate was filtered off and the filtrate was washed twice with dil. HCl and once with NaCl solution. The organic layer was dried over $Na_2SO_4$ and concentrated under reduced pressure to give a poly(butyl acrylate) having bromine atoms at both ends (5.21 g, 58%). The molecular weight and the molecular weight distribution of the polymer were found to be 3700 and 1.41, respectively, by GPC analysis (based on polystyrene standard).

To a 30 mL pyrex tube were added the poly(butyl acrylate) prepared as above (2.0 g), p-divinylbenzene (281 mg, 2.16 mmole), copper (I) bromide (77 mg, 0.54 mmole), 2,2'-bipyridyl (167 mg, 1.08 mmole) and MIBK (4 mL). The mixture was degassed by bubbling $N_2$ for 10 minutes and then sealed. The mixture was heated to 130° C. for 30 minutes and after cooling to ambient temperature, the mixture was diluted with ethyl acetate (10 mL). An insoluble precipitate was filtered off and the filtrate was washed twice with dil. HCl and once with Nacl solution. The organic layer was dried over $Na_2SO_4$ and concentrated under reduced pressure to give the poly(butyl acrylate) having alkenyl groups at both ends shown below (2.11 g). The molecular weight and the molecular weight distribution of the polymer were found to be 7300 and 2.47, respectively, by GPC analysis (based on polystyrene standard). The number of alkenyl groups introduced into the polymer was 2.1 based on $^1$H NMR analysis.

washed twice with dil. HCl and once with NaCl solution. The organic layer was dried over $Na_2SO_4$ and concentrated under reduced pressure to give a mixture of the poly(butyl acrylate) having alkenyl groups at both ends shown below and tributyltin bromide (4.48 g). The molecular weight and the molecular weight distribution of the polymer were found to be 7700 and 1.33, respectively, by GPC analysis (based on polystyrene standard). The number of alkenyl groups introduced into the polymer was 1.6 based on $^1$H NMR analysis.

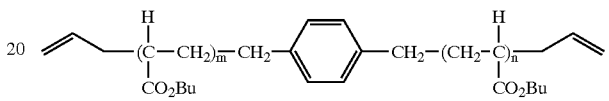

Example 5

To a 30 mL pyrex tube were added methyl acrylate (5 mL, 4.78 g, 55.6 mmole), α,α'-dibromo-p-xylene (292 mg, 1.1 lmmole), copper (I) bromide (159 mg, 1.11 mmole), 2,2'-bipyridyl (518 mg, 3.3 mmole), ethyl acetate (4 mL) and acetonitrile (1 mL). The mixture was degassed by two freeze-pump-thaw cycles and then sealed. The mixture was heated to 130° C. for 2.7 hours and after cooling to ambient temperature, allyltributyltin (0.82 mL, 2.66 immol) was added. The mixture was heated to 80° C. for 6 hours and then diluted with ethyl acetate (20 mL). An insoluble precipitate was filtered off and the filtrate was washed twice with dil. HCl and once with NaCl solution. The organic layer was dried over $Na_2SO_4$ and concentrated under reduced pressure. The crude polymer was dissolved in a small amount of acetone and then reprecipitated twice from hexane to yield the poly(methyl acrylate) having alkenyl groups at both ends shown below (2.80 g). The molecular weight and the molecular weight distribution of the polymer were found to

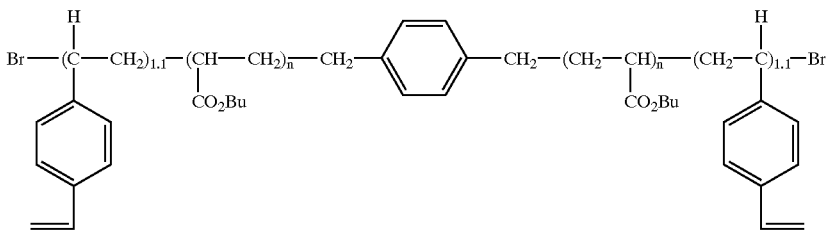

Example 4

To a 30 mL pyrex tube were added butyl acrylate (5 mL, 4.47 g, 34.9 mmole), α,α'-dibromo-p-xylene (185 mg, 0.69 mmole), copper (I) bromide (98 mg, 0.69 mmole), 2,21-bipyridyl (319 mg, 2.06 mmole), ethyl acetate (4 mL) and acetonitrile (1 mL). The mixture was degassed by bubbling $N_2$ for 10 minutes and then sealed. The mixture was heated to 130° C. for 1 hour and after cooling to ambient temperature, allyltributyltin (0.51 mL, 1.64 mmole) was added under $N_2$ atmosphere. The mixture was heated to 100° C. for 1 hour and then diluted with ethyl acetate (20 mL). An insoluble precipitate was filtered off and the filtrate was be 7000 and 1.26, respectively, by GPC analysis (based on polystyrene standard). The number of alkenyl groups introduced into the polymer was 1.7 based on $^1$H NMR analysis.

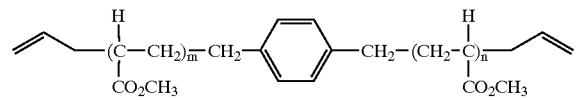

Preparative Example 2
(Synthesis of an Alkenyl Group-Containing Organohalogenated Compound)

To a 50 mL 2-necked flask flashed with N$_2$ were added 2-allyloxyethanol (2.5 mL, 23.4 mmole), pyridine (3 mL) and THF (10 mL). To the solution was slowly added 2-bromopropionyl chloride (2 mL, 19.52 mmole) at 0° C. and the stirring was continued for 1 hour at the same temperature. Ethyl acetate (10 mL) was added and the pyridinium hydrochloric acid salt was filtered off. The filtrate was washed with dil. HCl (10 mL), aq. NaHCO$_3$ (10 mL) and NaCl solution (10 mL). The organic layer was dried over Na$_2$SO$_4$ and concentrated under reduced pressure. Distillation of the crude material (78.5~81° C. at 1.3 mmHg) yielded allyloxy-2-bromopropionate shown below (2.986 g).

CH$_3$C(H)(Br)C(O)O—CH$_2$CH$_2$—O—CH$_2$CH=CH$_2$

Example 6

To a 30 mL pyrex tube were added butyl acrylate (2.5 mL, 2.24 g, 17.45 mmole), an alkenyl group-containing initiator prepared according to the Preparative Example 2 (165 mg, 0.698 mmole), copper (I) bromide (100 mg, 0.698 mmole), 2,2'-bipyridyl (218 mg, 1.40 mmole), ethyl acetate (2 mL) and acetonitrile (0.5 mL). The mixture was degassed by bubbling N$_2$ for 10 minutes and then sealed. The mixture was heated to 130° C. for 50 minutes and then after cooling to ambient temperature, the mixure was diluted with ethyl acetate (20 mL). An insoluble precipitate was filtered off and the filtrate was washed twice with dil. HCl and once with NaCl solution. The organic layer was dried over Na$_2$SO$_4$ and concentrated under reduced pressure to yield a poly(butyl acrylate) having an alkenyl group at one end and a bromine atom at the other end (1.90 g, 79%). The molecular weight and the molecular weight distribution of the polymer were found to be 3600 and 1.51, respectively, by GPC analysis (based on polystyrene standard). The number of alkenyl groups introduced into the polymer was 0.75 based on $^1$H NMR analysis.

To a 50 mL three-necked flask equipped with a stirring bar and a reflux condenser were added the poly(butyl acrylate) obtained as above (1.90 g), Na$_2$S·9H$_2$O (70.2 mg, 0.293 mmole) and ethanol (3 mL). The mixture was heated to ref lux temperature for 3 hours. After cooling to ambient temperature, ethyl acetate (10 mL) and dil. HCl (10 mL) were added and the layers were separated. The organic layer was washed with dil. HCl and NaCl solution. The organic layer was dried over Na$_2$SO$_4$ and concentrated under reduced pressure to give the poly(butyl acrylate) having alkenyl groups at both ends shown below (1.69 g). The molecular weight and the molecular weight distribution of the polymer were found to be 5100 and 1.73, respectively, by GPC analysis (based on polystyrene standard).

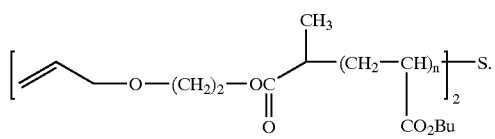

Example 7

To a 30 mL pyrex tube were added methyl acrylate (5 mL, 4.78 g, 55.5 mmole), allyl 2-methyl-2-bromopropionate (0.354 mL, 460 mg, 2.2 mmole), copper (I) bromide (318 mg, 2.22 mmole), 2,21-bipyridyl (1.04 g, 6.66 mmole), ethyl acetate (4 mL) and acetonitrile (1 mL). The mixture was degassed by three freeze-pump-thaw cycles and then sealed. The mixture was heated to 80° C. for 3 hours and then after cooling to ambient temperature, the mixture was diluted with ethyl acetate (20 mL). An insoluble precipitate was filtered off and the filtrate was washed twice with dil. HCl and once with NaCl solution. The organic layer was dried over Na$_2$SO$_4$ and concentrated under reduced pressure to yield a poly(butyl acrylate) having an alkenyl group at one end and a bromine atom at the other end (3.93 g, 75%). The molecular weight and the molecular weight distribution of the polymer were found to be 2700 and 1.48, respectively, by GPC analysis (based on polystyrene standard). The number of alkenyl groups introduced into the polymer was 0.81 based on $^1$H NMR analysis.

To a 50 mL three-necked flask equipped with a stirring bar and a reflux condenser were added the poly(butyl acrylate) obtained as above (1.17 g), Na$_2$S·9H$_2$O (57.6 mg, 0.240 mmole) and ethanol (2 mL). The mixture was heated to reflux temperature for 3 hours. After cooling to ambient temperature, ethyl acetate (10 mL) and dil. HCl (10 mL) were added and the layers were separated. The organic layer was washed with dil. HCl and NaCl solution. The organic layer was dried over Na$_2$SO$_4$ and concentrated under reduced pressure to give the poly(butyl acrylate) having alkenyl groups at both ends shown below (1.11 g). The molecular weight and the molecular weight distribution of the polymer were found to be 4200 and 1.71, respectively, by GPC analysis (based on polystyrene standard).

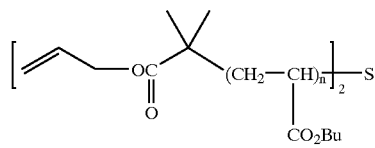

Example 8

To a 100 mL pyrex tube were added butyl acrylate (10 mL, 8.94 g, 69.8 mmole), an alkenyl group-containing initiator prepared according to the Preparative Example 2 (332 mg, 1.40 mmole), copper (I) bromide (200 mg, 1.40 mmole), 2,21-bipyridyl (433 mg, 2.80 mmole), ethyl acetate (8 mL) and acetonitrile (2 TML). The mixture was degassed by bubbling N$_2$ for 10 minutes and then sealed. The mixture was heated to 130° C. for 1.5 hours. After cooling to ambient temperature, p-divinylbenzene (364 mg, 2.80 mmol) was added under N$_2$ atmosphere and then sealed. The mixture was heated to 100° C. for 2 hours and then diluted with ethyl acetate (30 mL). An insoluble precipitate was filtered off and the filtrate was washed twice with dil. HCl and once with NaCl solution. The organic layer was dried over Na$_2$SO$_4$ and concentrated under reduced pressure to give the poly(butyl acrylate) having an alkenyl group at both ends shown below (6.43 g, 69%). The molecular weight and the molecular weight distribution of the polymer were found to be 3900 and 5.35, respectively, by GPC analysis (based on polystyrene standard). The number of alkenyl groups introduced onto the polymer was 1.73 based on $^1$H NMR analysis.

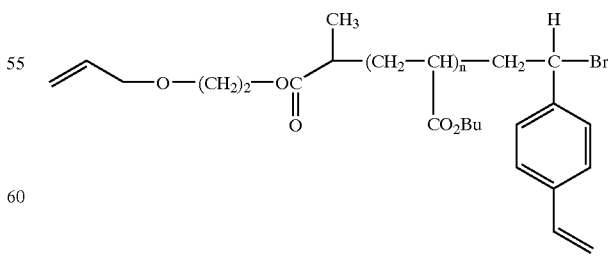

Examples 9–14

The polymers having an alkenyl group at both ends obtained in the Example 1, 2, 3, 6, 7 and 8 were dissolved in toluene and treated with an equal amount of aluminum silicate Kyoward 700PEL (manufactured by Kyowa Kagaku Co. Ltd.) for 1 hour at 100° C. to remove a small amount of impurities in the polymers.

The purified polymers were mixed with a polyvalent hydrogensilicon compound shown below and Pt(0)-1,1,3,3-tetramethyl-1,3-divinylsiloxane complex ($8.3 \times 10^{-8}$ mol/L in xylene). The amount of the polyvalent hydrogensilicon compound was such that the molar ratio of the hydrosilyl group to the alkenyl group was 1.2. The amount of the Pt catalyst was $10^{-4}$ or $10^{-3}$ mole, based on 1 mole of the alkenyl group of the (meth)acrylate polymers.

A portion of each composition was placed on a hot plate and the gelation times (the time which is required for forming a rubbery elastomer) were measured at 130° C. The results were summarized in Table 1.

The remainders of the compositions were defoamed under reduced pressure at ambient temperature and were cured at 100° C. for the indicated times to yield homogeneous rubbery materials. The gel contents of the obtained cured materials were calculated based on their weight change after immersing them into toluene for 24 hours. The results were also shown in Table 1.

organic layer was dried over $Na_2SO_4$ and concentrated under reduced pressure to give a poly(butyl acrylate) having a bromine atom at both ends (3.04 g, 68%). The molecular weight and the molecular weight distribution of the polymer were found to be 5200 and 1.17, respectively, by GPC analysis (based on polystyrene standard).

To a 30 mL pyrex tube were added the poly(butyl acrylate) obtained as above (1 g), trimethoxysilylpropyl methacrylate (285 mg, 1.15 mmole), copper (I) bromide (27.6 mg, 0.193 muole), 2,2'-bipyridyl (300 g, 1.93 mmole) and ethyl acetate (3 mL). The mixture was heated to 130° C. for 6 hours to yield the poly(butyl acrylate) having trimethoxysilyl groups at both ends shown below.

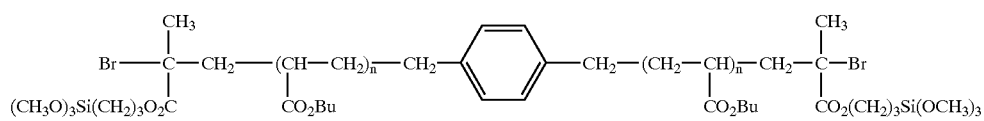

Example 16

To a 30 mL pyrex tube were added butyl acrylate (5 mL, 4.47 g, 34.9 mmole), a,a'-dibromo-p-xylene (185 mg, 0.70 mmole), copper (I) bromide (100 mg, 0.70 mmole), 2,2'-bipyridyl (217 mg, 1.40 mmole), ethyl acetate (4 mL) and acetonitrile (1 mL). The mixture was degassed by bubbling $N_2$ for 10 minutes and then sealed. The mixture was heated to 130° C. for 2 hours. After cooling to ambient temperature, methyldimethoxysilylpropyl methacrylate (650 mg, 2.8 mmol) was added and the mixture was heated to 100° C. for 2 hours. After cooling, the mixture was diluted with ethyl

TABLE 1

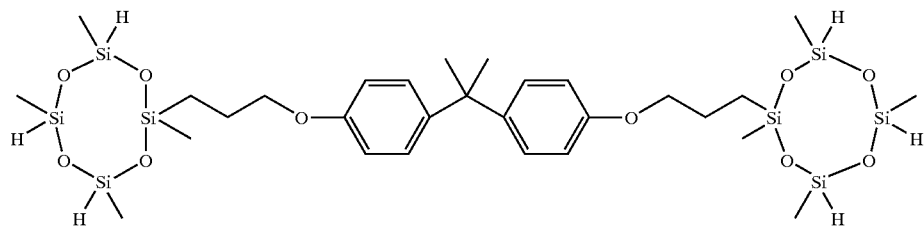

| Example No. | polymer | the amount Pt cat.[a] | gel time (sec) | curing time (hour) | gel content (%) |
|---|---|---|---|---|---|
| 9 | Example 1 | $10^{-3}$ | 180 | 15 | 51 |
| 10 | Example 2 | $10^{-3}$ | 45 | 17 | 55 |
| 11 | Example 3 | $10^{-3}$ | 100 | 3 | 77 |
| 12 | Example 6 | $10^{-3}$ | 240 | 18 | 77 |
| 13 | Example 7 | $10^{-3}$ | 120 | 15 | 40 |
| 14 | Example 8 | $10^{-4}$ | 11 | 12 | 84 |

[a]based on 1 mol of the alkenyl group of the (meth)acrylate polymers.

Example 15

To a 30 mL pyrex tube were added butyl acrylate (5 mL, 4.47 g, 34.9 mmole) α,α'-dibromo-p-xylene (185 mg, 0.70 mmole), copper (I) bromide (100 mg, 0.70 mmole), 2,2'-bipyridyl (1.09 g, 7.0 mmole) and acetonitrile (5 mL). The mixture was degassed by three freeze-pump-thaw cycles and then sealed. The mixture was heated to 130° C. for 6 hours and diluted with ethyl acetate (20 mL). An insoluble precipitate was filtered off and the filtrate was washed three times with dil. HCl and once with NaCl solution. The acetate (20 mL). An insoluble precipitate was filtered off and the filtrate was washed twice with aq. $NH_4Cl$ and once with NaCl solution. The organic layer was dried over $Na_2SO_4$ and concentrated under reduced pressure to give the poly(butyl acrylate) having methyl dimethoxysilyl groups at both ends shown below (4.78 g, 90%). The molecular weight and the molecular weight distribution of the polymer were found to be 7100 and 1.74, respectively, by GPC analysis (based on polystyrene standard). The number of silyl groups introduced into the polymer was 3.3 based on $^1H$ NMR analysis.

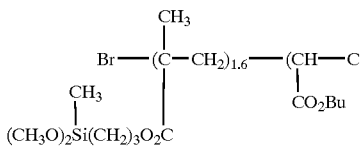 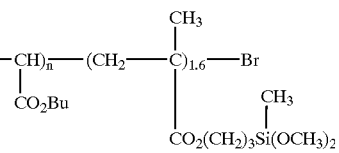

The poly(butyl acrylate) having methyl dimethoxysilyl groups at both ends obtained as above (2.5 g) was mixed with dibutyltin di(acetylacetonate) (75 mg). The mixture was defoamed under reduced pressure at ambient temperature and was cured at ambient temperature for 7 days to yield a homogeneous rubbery material. The gel content of the material was found to be 54%.

As can be seen from Examples 1 to 8, 15 and 16, the preparative methods of the present invention provide convenient production of (meth)acrylic polymers having alkenyl or curable silyl groups at the chain ends in high ratios, which have so far been difficult to prepare. As seen from the Examples 9 to 14 and 16, these (meth)acrylic polymers show good curability and yield homogeneous rubbery materials.

What is claimed is:

1. A curable composition which comprises:
   (A) a (meth)acrylic polymer having alkenyl groups at the chain ends prepared by the process comprising the steps of:
   (i) preparing a (meth) acrylic polymer having a chain end structure of formula (1)

—CH$_2$—C(R$^1$)(CO$_2$R$^2$)(X)     (1)

wherein R$^1$ is hydrogen or methyl; R$^2$ is a C$_{1-20}$ alkyl, C$_{6-20}$ aryl or C$_{7-20}$ aralkyl; X is chlorine, bromine or iodine;
   by polymerizing (meth) acrylate monomers using an organohalogenated compound or a halosulfonyl compound as an initiator and a metal complex catalyst wherein the central metal atom is selected from the group consisting of the elements of Groups 8, 9, 10 and 11 of the periodic table; and
   (ii) converting the halogen atom in the structure of formula (1) into an alkenyl group-containing substituent; and
   (B) a polyvalent hydrogensilicon compound.

2. The curable composition of claim 1, wherein the (meth)acrylic polymer having alkenyl groups at the chain ends has a number average molecular weight of from 500 to 50,000.

3. A curable composition comprising a (meth)acrylic polymer having curable silyl groups at the chain ends prepared a process comprising the steps of:
   (i) preparing a (meth) acrylic polymer having a chain end structure of formula (1)

—CH$_2$—C(R$^1$)(CO$_2$R$^2$)(X)     (1)

wherein R$^1$ is hydrogen or methyl; R$^2$ is a C$_{1-20}$ alkyl, C$_{6-20}$ aryl or C$_{7-20}$ aralkyl; X is chlorine, bromine or iodine
   by polymerizing (meth) acrylate monomers using an organohalogenated compound or a halosulfonyl compound as an initiator and a metal complex catalyst wherein the central metal atom is selected from the group consisting of the elements of Groups 8, 9, 10 and 11 of the periodic table; and
   (ii) converting the halogen atom in the structure of formula (1) into a curable silyl group-containing substituent.

4. The curable composition of claim 3, wherein the (meth)acrylic polymer having curable silyl groups at the chain ends has a number average molecular weight of from 500 to 50,000.

5. The curable composition of claim 3, wherein the (meth) acrylic polymer obtained in step (i) is reacted with a compound having a polymerizable alkenyl group and a curable silyl group to convert the halogen atom in the structure of formula (1) into a curable silyl group-containing substituent.

6. The curable composition of claim 5, wherein the (meth) acrylic polymer having curable silyl groups at the chain ends has a number average molecular weight of from 500 to 50,000.

7. The curable composition of claim 5, wherein said compound having a polymerizable alkenyl group and a curable silyl group is a compound of formula 6

H$_2$C=C(R$^3$)—R$^4$—R$^5$—[Si(R$^{16}$)$_{2-b}$(Y)$_b$O]$_m$—Si(R$^{17}$)$_{3-a}$(Y)$_a$     (6)

wherein R$^3$ is hydrogen or methyl; R$^4$ is —C(O)O—, or o-, m-, p-phenylene; R$^5$ is a direct connection or a C$_{1-20}$ divalent organic group which may contain at least one ether oxygen; each of R$^{16}$ and R$^{17}$ is independently a C$_{1-20}$ alkyl, C$_{6-20}$ aryl or C$_{7-20}$ aralkyl, or a triorganosiloxy group represented by (R')$_3$SiO—, wherein R' is a monovalent C$_{1-20}$ alkyl, C$_{6-20}$ aryl or C$_{7-20}$ aralkyl, and the three R' groups may be the same or different; each of the R$^{16}$ group may be the same or different when more than one R$^{16}$ group is present; and each of the R$^{17}$ group may be the same or different when more than one R$^{17}$ group is present; Y is hydroxyl or a hydrolyzable group, and each of the Y groups may be the same or different when more than one Y group is present; a is 0, 1, 2 or 3; b is 0, 1 or 2; m is an integer from 0 to 19 provided that a+mb≧1.

8. The curable composition of claim 7, wherein the (meth) acrylic polymer having curable silyl groups at the chain ends has a number average molecular weight of from 500 to 50,000.

* * * * *

UNITED STATES PATENT AND TRADEMARK OFFICE
CERTIFICATE OF CORRECTION

PATENT NO. : 6,667,369 B2
DATED : December 23, 2003
INVENTOR(S) : Kusakabe et al.

It is certified that error appears in the above-identified patent and that said Letters Patent is hereby corrected as shown below:

<u>Title page,</u>
Item [60], Related U.S. Application Data, change "Continuation of application No. PCT/JP00/01763, filed on Mar. 23, 2000, which is a division of application No. 09/356,515, filed on Jul. 19, 1999 now Pat. No. 6,420,492, which is a division of application No. 08/798,034 filed on Feb. 6, 1997, now Pat. No. 5,986,014" to be
-- Division of application No. 09/356,515, filed on Jul. 19, 1999 now Pat. No. 6,420,492, which is a division of application No. 08/798,034, filed on Feb. 6, 1997, now Pat. No. 5,986,014 --

Signed and Sealed this

Eleventh Day of May, 2004

JON W. DUDAS
*Acting Director of the United States Patent and Trademark Office*